United States Patent [19]
Barton et al.

[11] Patent Number: 5,858,144
[45] Date of Patent: Jan. 12, 1999

[54] LOW TEMPERATURE JOINING OF CERAMIC COMPOSITES

[75] Inventors: Thomas J. Barton; Iver E. Anderson; Sina Ijadi-Maghsoodi; Mohammad Nosrati; Ozer Unal, all of Ames, Iowa

[73] Assignee: Iowa State University Research Foundation, Inc., Ames, Iowa

[21] Appl. No.: 631,259

[22] Filed: Apr. 12, 1996

[51] Int. Cl.$^6$ .................................................. C04B 37/00
[52] U.S. Cl. ............................... 156/89; 501/89; 501/92; 423/345; 420/548
[58] Field of Search ............................... 156/89; 501/89, 501/92, 94; 423/345; 420/548

[56] References Cited

U.S. PATENT DOCUMENTS

| | | | |
|---|---|---|---|
| 4,225,262 | 9/1980 | Koop et al. | 403/272 |
| 4,270,691 | 6/1981 | Ishii et al. | 228/194 |
| 4,297,779 | 11/1981 | Melton et al. | 29/446 |
| 4,940,767 | 7/1990 | Barton et al. | 528/35 |
| 5,009,961 | 4/1991 | Niebylski | 428/446 |
| 5,201,947 | 4/1993 | Niebylski | 106/287.11 |
| 5,228,620 | 7/1993 | Anderson et al. | 239/8 |
| 5,400,947 | 3/1995 | Wang et al. | 228/124 |
| 5,407,504 | 4/1995 | Ewart-Paine | 156/323 |
| 5,457,074 | 10/1995 | Barton et al. | 501/88 |
| 5,632,925 | 5/1997 | Moulton et al. | 156/89 X |

OTHER PUBLICATIONS

"High Temperature Bonding of Silicon Carbide", Masters Thesis, New Mexico Institute of Mining and Technology, Aug. 28, 1989, Gehris.
Joining of Non–Oxide Ceramics for High Temperature Applications, Bates et al Ceramic Bulletin, 69, 3 (1990).
Bonding Mechanism Between Silicon Carbide and Thin Foils of Reactive Metal, Morozumi et al, J. of Materials Science, 20, (1985).
Feasibility Study of the Welding of SiC, Moore J. Am. Ceram. Soc. 68(6), C–151–153, (1985).
Effects of Joining Pressure and Deformation on the Strength and Microstructure of Diffusion—Bonded Silicon Carbide, J. Am. Ceram. Soc. 75(3) (1992).
Joining of Silicon Carbide/Silicon Carbide Composites . . . Titanium Carbon–Nickel System; J. Am. Ceram. Soc. 75(1) pp. 131–135 1992; Barry H. Rabin.
Joining of SiC to SiC Using Polyborosiloxane; p. 253. (1981).
Joining of Self–Bonded Silicon Carbide by Germanium Metal; Comm. Am. Cer. Soc., Jan., 1981, p. C–13; Iseki, et al.

(List continued on next page.)

*Primary Examiner*—Daniel Zirker
*Attorney, Agent, or Firm*—Edward J. Timmer

[57] ABSTRACT

A method of joining similar or dissimilar ceramic and ceramic composite materials, such as SiC continuous fiber ceramic composites, at relatively low joining temperatures uses a solventless, three component bonding agent effective to promote mechanical bond toughness and elevated temperature strength to operating temperatures of approximately 1200 degrees C. The bonding agent comprises a preceramic precursor, an aluminum bearing powder, such as aluminum alloy powder, and mixtures of aluminum metal or alloy powders with another powder, and and boron powder in selected proportions. The bonding agent is disposed as an interlayer between similar or dissimilar ceramic or cermaic composite materials to be joined and is heated in ambient air or inert atmosphere to a temperature not exceeding about 1200 degrees C. to form a strong and tough bond joint between the materials. The bond joint produced is characterized by a composite joint microstructure having relatively soft, compliant aluminum bearing particulate regions dispersed in a ceramic matrix.

16 Claims, 2 Drawing Sheets

OTHER PUBLICATIONS

Creep Behavior and Structural Characterization at High Temperatures of Nicalon SiC Fibers; J. Mat. Sci. 19, 1984, pp. 3658–3670; G. Simon, et al.

Thermal Stability of SiC Fibers (Nicalon); J. Mat. Sci. 19, 1984, pp. 1191–1201; T. Mah, et al.

Brazing of Pressureless–Sintered SiC Using Ag–Cu–Ti Alloy; pp. 2431–2434; Jonal Kofi Boadi, et al, 1987.

Joining of Dense Silicon Carbide by Hot Pressing; J. Mat. Sci. 15, 1980, pp. 1049–1051.

$Ti_3SiC_2$ Phase in SiC/SiC Joint Brazed with $Cu_{43}T_{57}$ Alloy; pp. 1417–1418; T. Nishino, et al., 1990.

Development of a Toughened SiC Bond Material for Joining of Continuous Fiber Ceramic Composites; Presented at CESP/CFCC Joining Workshop, Chicago, IL, Sep. 20, 1995, I.E. Anderson, et al.

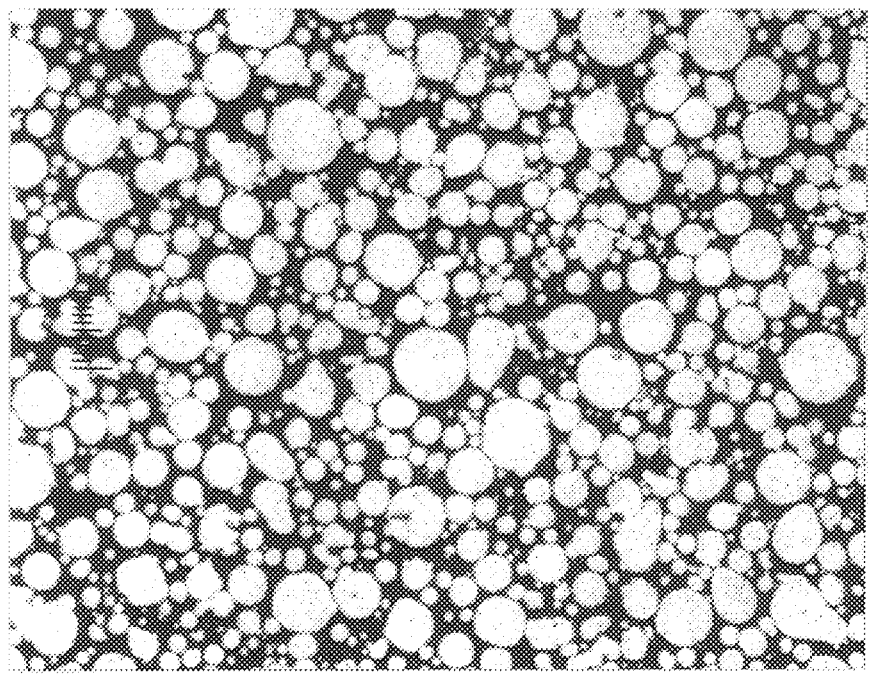
FIG. IA
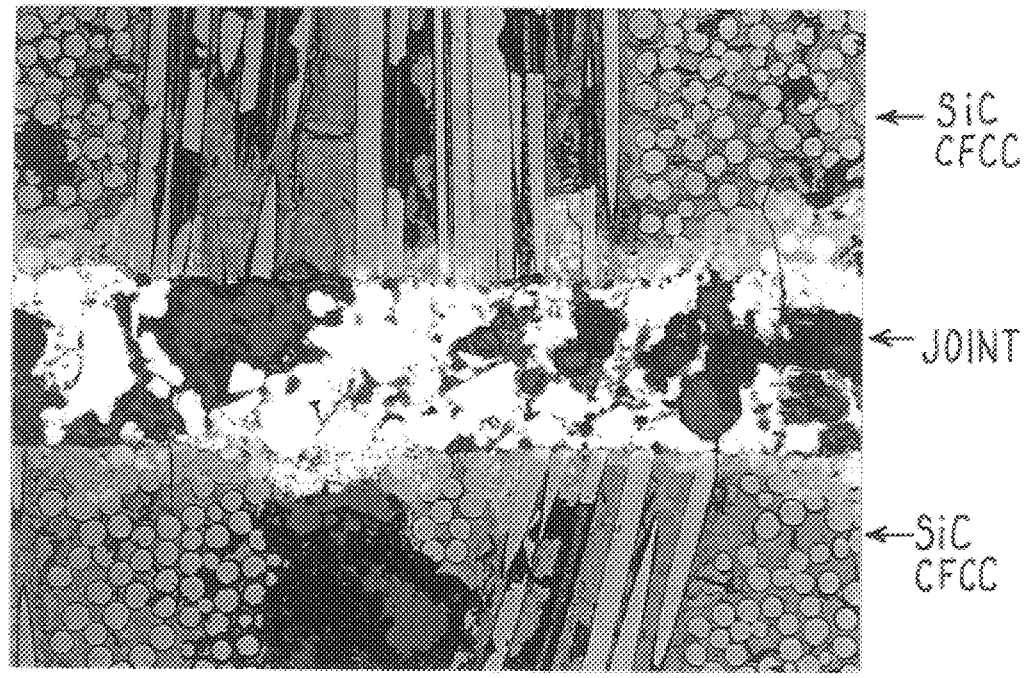
FIG. IB

LOW TEMPERATURE JOINING OF CERAMIC COMPOSITES

CONTRACTURAL ORIGIN OF THE INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to joining of ceramics and ceramic composites at relatively low temperatures and in ambient air atmosphere, if desired, and to bonding agents to this end.

BACKGROUND OF THE INVENTION

In recent years, there has been great commercial interest in and government support for the use of ceramic composites, particularly SiC continuous fiber ceramic composites (CFCC) materials, for structural applications in high temperature and/or corrosive environments. This materials substitution trend recognizes that traditional stainless steels and superalloys have reached their operational limits and that further enhancements of process efficiency in applications such as power generation heat exchangers requires the high temperature and chemical stability and tolerance of SiC CFCC materials. Unfortunately, the lack of convenient joining methods for SiC CFCC materials has limited their service applications because of the difficulty of winding large, complex SiC fiber preforms and of infilitating the preforms with SiC matrix material.

A goal of the art has been to assemble complex structures from a set of simple SiC CFCC component shapes joined together so as to collectively provide the desired complex structural shape with sufficient strength and toughness to be tolerant of severe environments and rough handling, enabling the potential of SiC CFCC materials to be more fully realized.

To-date, joining of monolithic SiC shapes has been accomplished by a variety of techniques including direct diffusion bonding, co-densification of interlayer and green bodies, diffusion welding or brazing with boride, carbide, and silicide interlayers, hot pressing of sinterable SiC powder, bonding with polymeric precursors, brazing with oxide, reactive metal bonding, and active metal brazing. These joining techniques typically require prolonged exposure to high temperatures above 1600 degrees C. and/or strict inert joining atmospheres and many require a bonding agent including a solvent to provide proper bonding material viscosity. Existing commercial SiC CFCC materials almost universally employ "NICALON" SiC fibers which contain some residual $SiO_2$ and free C.

Many investigators have reported that these residual phases contribute to a fiber degradation reaction that has an onset temperature of about 1200 degree C. Thus, any SiC CFCC joining technique that requires firing temperatures above 1200 degrees C. is not desirable because some degree of fiber degradation and a resulting decrease in strength of the CFCC may occur.

An object of the present invention is to provide a method of joining ceramic and ceramic composite materials at relatively low temperatures that avoids degradation of the ceramic material; e.g. not exceeding 1200 degrees C. for joining SiC fiber CFCC materials.

Another object of the present invention is to provide a method of joining ceramic and ceramic composite materials that can be practiced in ambient air, if desired, in order to facilitate fabrication of structures on-site under a wide variety of field assembly conditions.

Still another object of the present invention is to provide a bonding agent for joining or repairing ceramic and ceramic composite materials that is effective to promote mechanical bond toughness and elevated temperature strength and that can be used at relatively low temperatures without the need for infiltration and without the need for solvents.

Still a further object of the present invention is to provide a bonded structure characterized by a joint microstructure having improved strength and toughness by virtue of including relatively soft, compliant phase regions dispersed in a ceramic joint matrix.

SUMMARY OF THE INVENTION

The present invention provides a method of joining similar or dissimilar ceramic and ceramic composite materials at relatively low joining temperatures using a solventless, three component bonding agent effective to promote mechanical bond toughness and elevated temperature strength to operating temperatures of approximately 1200 degrees C.

A bonding agent in accordance with an embodiment of the present invention comprises a preceramic precursor, an aluminum bearing powder, such as aluminum metal powder, and boron powder in selected proportions to provide desired mechanical bond toughness and elevated temperature strength for a given service application.

In accordance with a method embodiment of the present invention, the bonding agent is disposed as an interlayer between similar or dissimilar ceramic or cermaic composite materials to be joined and the interface is heated to a temperature not exceeding about 1200 degrees C. to pyrolyze the preceramic polymer so as to form a strong and tough bond joint between the materials.

The method advantageously can be practiced in ambient air atmosphere using an open flame of a propane or other torch to heat the materials to the bonding temperature. This facilitates fabrication of structures on-site under a wide variety of field assembly conditions. Alternately, an inert or air atmosphere can be used in a firing furnace.

The bond joint produced in accordance with another embodiment of the present invention is characterized by a composite joint microstructure having relatively soft, compliant aluminum bearing phase regions, such as aluminum-silicon alloy particles, disposed in a ceramic matrix, such as SiC, and exhibiting substantially improved joint strength and toughness.

In accordance with another method embodiment of the present invention, the bonding agent is used as a filler material to repair a crack, pinhole or other depression in a ceramic and ceramic composite member and heated to a temperature not exceeding about 1200 degrees C. to form a strong and tough repair filler bond with the ceramic material.

The present invention is especially useful for, although not limited to, bonding of SiC continuous fiber ceramic composite (CFCC) materials together without harmful degradation of the SiC fibers so as to form a desired structure having sufficient strength and toughness that is tolerant of severe environments and handling and service stresses. The aforementioned and other objects and advantages of the present invention will become more apparent from the following detailed description taken with the following drawings.

DESCRIPTION OF THE DRAWINGS

FIG. 1 presents photomicrographs of bond joints between SiC CFCC materials in FIG. 1a as partially fired (400 degrees for 2 hours in air) after initial polymer (MPSA) pyrolysis (only bonding agent shown) and in FIG. 1b in a fully fired condition (SiC CFCC materials shown as joined by bonding agent after 2 hours at 1200 degrees C. in air). FIGS. 1a and 1b are optical micrographs of as-polished samples taken at 200×(total scale dimension on each figure is 50 microns).

DESCRIPTION OF THE INVENTION

Figure 2:
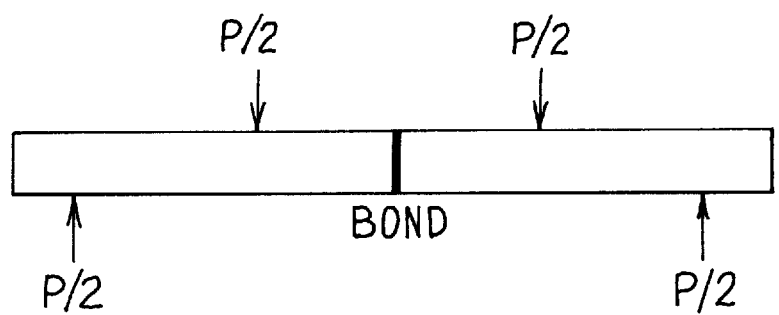
FIG. 2 is a schematic illustration of the four-point bend test configuration and the butt joint sample in place for measurement of flexural strength where P represents force on the sample.

The present invention provides a method of joining similar or dissimilar ceramic and ceramic composite materials at relatively low joining temperatures using a solventless, three component bonding agent effective to promote mechanical bond toughness and elevated temperature strength to operating temperatures of approximately 1200 degrees C. The invention is especially useful for bonding of continuous fiber ceramic composite (CFCC) materials having SiC fibers in a SiC matrix without harmful degradation of the SiC fibers so as to form a desired structure having sufficient strength and toughness to withstand severe environments and handling and service stresses. However, the invention is not limited to CFCC materials, or to SiC CFCC materials in particular, and can be practiced to bond monolithic ceramic bodies or components to form a structure or substructure. The invention can be practiced to join other carbide-based (e.g. $B_4C$, TiC, HfC) CFCC ceramic composites, nitride-based (e.g. $Si_3N_4$, AlN, TiN) CFCC ceramic composites, and boron-based (e.g. $TiB_2$) CFCC ceramic composites for purposes of illustration only. The invention will be described in detail herebelow with respect to bonding SiC CFCC materials for purposes of illustration only and not of limitation.

In accordance with an embodiment of the invention, the three component bonding agent comprises a preceramic oligomeric polymer, aluminum bearing powder particulates, and boron powder particulates in selected proportions to provide desired mechanical bond toughness and elevated temperature strength for a given service application. A preferred preceramic oligomeric polymer comprises an oligomeric form of a silicon-acetylene polymer with an average molecular weight of about 2000, a chemical formula of $SiC_9H_8$, and a char yield after pyrolysis of approximately 80%. This particular silicon-acetylene polymer has a fluid-like consistency and does not require a solvent addition to blend with the other powder particulate components of the bonding agent to form a putty or paste that can be applied to surface(s) to be bonded. This particular preceramic polymer begins to form beta SiC of crystallite size of about 10 nanometers (nm) diameter at about 1000 degrees C.

The aforementioned oligomeric form of a silicon-acetylene polymer having an average molecular weight of about 2000, a chemical formula of $SiC_9H_8$, and a char yield after pyrolysis of approximately 80% can be produced pursuant to U.S. Pat. No. 4,940,767, the teachings of which are incorporated herein by reference.

Synthesis procedures for methylphenylsilylene-acetylene (MPSA) polymers are described in Examples 1 and 2 set forth herebelow in the EXAMPLES section for illustration.

The invention is not limited to the particular preceramic polymer described hereabove and can be practiced using other preceramic polymers such as polycarbosilane, copolymer of MPSA and tetramethyldisilylene-acetylene, alternating copolymers of MPSA and dimethylsilylene vinylene polymers, siloxane polymers, polysilazanes and polysilanes, etc. with appropriate amount of control on the polymerization reaction to form a similar oligomer polymer which will undergo a similar type of pyrolysis reaction with similar reaction products and temperatures. The polycarbosilane polymer is available from Nippon Carbon Company as distributed in the United States by Dow Corning Corporation. Synthesis of copolymer of MPSA and tetramethyldisilylene-acetylene is described in Example 7 set forth herebelow. Synthesis of alternating copolymer of MPSA and dimethylsilylene vinylene polymers is described in Example 8 set forth herebelow.

The aluminum bearing powder particulates of the bonding agent can comprise aluminum metal powder, aluminum alloy powder (e.g. Al—Si alloy powder), and mixtures of aluminum metal or alloy powders with another powder (e.g. elemental Al powder and elemental Si powder). Preferred aluminum bearing powder particulates comprise a eutectic composition Al-12.2 atomic % Si alloy powder that melts at about 577 degrees C. Such Al—Si alloy powder can be made by high pressure inert gas atomization as generally spherical particles in the particle size range of less than 44 microns diameter as described, for example, in Anderson U.S. Pat. No. 5 228 620, the teachings of which are incorporated herein by reference to this end. Such inert gas atomized Al—Si alloy powder particles typically contain oxygen as an impurity at levels of about 200 to 600 parts per million by weight. Although the Al—Si powder preferably is made by the high pressure inert gas atomization, any other atomization, mechanical comminution or other powder forming process that produces a fine powder (e.g. size less than about 50 microns diameter) of reasonable purity with high surface area also can be used in the practice of the invention.

The aluminum bearing powder particulates also may comprise non-eutectic or off-eutectic Al—Si alloy powders. The aluminum bearing powder particulates also can comprise other Al alloy systems having low melting point eutectic compositions and a stable carbide forming second alloy component, such as the binary Al systems alloyed with rare earth elements such as La, Ce, or Y. Furthermore, elemental aluminum powder and mixtures of elemental or alloy aluminium powder with other elemental or alloy powders, such as Si powder may be used.

The boron powder particulates of the bonding agent preferably comprise ground, submicron, amorphous, high purity (e.g. 99.999%) boron which can be obtained from Aldrich Chemical Company and having a particle size less than one (1) micron. This boron powder appears to have oxygen as its only major impurity present on the powder particle surface as $B_2O_3$.

The preceramic oligomeric polymer, aluminum bearing powder particulates, and boron powder particulates constituting the bonding agent are present in selected proportions to provide desired mechanical bond toughness and elevated temperature strength for a given service application. The three components of the bonding agent preferably are present in proportions effective to promote mechanical bond toughness and elevated temperature strength to operating temperatures of approximately 1200 degrees C.

A preferred proportion of the three components of the bonding agent comprises, in weight %, about 25% to 85% preceramic polymer, about 10% to 70% aluminum bearing powder, and about 2% to 6% boron powder. A more preferred proportion comprises, in weight %, about 37–38% preceramic preceramic polymer, about 55–56% aluminum bearing powder, and about 5–6% boron powder. A particularly preferred bonding agent comprises 37.73 weight % preceramic MPSA polymer, 56.6 weight % Al-12.2 atomic % Si eutectic powder and 5.66 weight % boron powder.

The bonding agent can be hand mixed in a glass container in laboratory ambient air, on a bench top, or under field conditions to provide a joint bonding putty or paste that can be readily applied to the surface(s) to be bonded. Since solvents are not needed in the bonding agent to dilute the polymer for mixing, the bonding agent advantageously can be mixed outside of a chemcial fume hood. After mixing, the bonding agent can be loaded into a polyethylene syringe for convenient dispensing onto one or both surfaces of the materials to be joined. Alternately, a laboratory spatual or other application tool also can be used to apply and spread the bonding agent on one or both surfaces to be joined. The bonding agent typically is applied between the materials to be bonded as an even or uniform interlayer in a thickness range of 100 to 300 microns, although the invention is not limited to any particular thickness of bonding agent or to uniform surface coverage.

Surfaces of SiC CFCC materials have been joined either on exposed SiC fiber end (transverse) sections or on surfaces parallel (longitudinal) to the SiC woven fiber plies. Longitudinal surfaces can be joined either in the as-received condition or after mechanical grinding to expose the SiC fibers in longitudinal cross-section. Joints can be assembled by simple hand pressure and either rested on a ceramic substrate for subsequent furnace firing or clamped in position for open flame torch firing in ambient air. In the preparation of joints for mechanical testing that require careful alignment, a clamping jig or fixture can be used to maintain alignment during furnace firing. In some cases, a short period of open flame torch pre-firing can be performed to "set" the joint before furnace firing to eliminate the need for furnace fixturing to maintain alignment.

Advantageously, a method embodiment of the invention includes open flame propane torch firing (flame temperature of about 1200 to 1300 degrees C.) of the joint for a short time (e.g. approximately 5 minutes) to completely through-heat the joint, especially a small thermal mass joint such as was present on small (3 mm by 4 mm) butt joints of joint bend test specimens described herebelow. The use of open flame propane torch firing of the joint is especially useful in making joints on-site under field conditions.

Alternately, another method embodiment of the invention includes a more controlled furnace firing of the joint using either an inert atmosphere (using graphite furnace elements) or an air atmosphere (using SiC furnace elements). A typical furnace firing cycle for purposes of illustration only consists of heating at a rate of 10 degrees C. per minute to 1200 degrees C., holding for 2 to 5 hours at 1200 degrees C., and cooling at a rate of 5 to 10 degrees C. per minute in the furnace to room temperature, although other firing cycles can be used in the practice of the invention. A typical illustrative fired joint thickness has been measured at about 40 to 100 microns, although the invention is not limited to any particular fired joint thickness.

Differential thermal analysis and microstructural analysis of the joint at stages of firing indicates that bond formation occurs in a series of steps leading to a final joint. Upon heating, bond formation appears to involve a first reaction ranging from about 300 degrees C. to 400 degrees C. wherein pyrolysis of the preceramic polymer and release of carbon and hydrogen as pyrolysis reaction products occur. The hydrogen and some of the carbon evolve from the joint region as $H_2$ or hydrocarbon gases. Next, the aluminum bearing powder, such as the eutectic Al-12.2 atomic % Si alloy powder, melts (at 577 degrees C. for the etuectic Al—Si powder) to form individual molten Al—Si droplets of the alloy dispersed in the pyrolyzed polymer matrix that contains the fine, submicron boron powder. Upon further heating, several exothermic reactions may occur that apparently consume some of the Al and some of the Si from the Al—Si droplets, the oxygen from the surfaces of the B powder, and the free carbon from the pyrolysis char, forming SiC and $Al_2O_3$ and leaving molten Al—Si particles. The B and molten Al—Si particles probably react with some of the carbon from the pyrolysis char to form some boron carbide and aluminum boride during the highest temperature portion of the firing cycle. However, the inventors do not wish or intend to be bound by the explanation of the bond formation process in that the exact temperatures and product phases of the exothermic reactions that may occur above 577 degrees C. are not known and are the subject of further investigation.

Post-firing microstructural analysis of the fired joint between SiC CFCC materials using particularly preferred bonding agent described hereabove reveals both crystalline and amorphous SiC as product phases of the bond joint matrix as well as the presence of dispersed Al—Si particles and alumina particles in the SiC matrix. The amount of boron added initially as the third bonding agent component was not detected as a a distinct product phase in the fired joint microstructure or in X-ray diffraction measurements, probably due to its small predicted volume fraction and its tendency to diffuse rapidly and to disperse widely at elevated firing temperatures.

Representative partially fired and fully fired bond joints are shown for comparison in FIG. 1a, 1b. The fully fired bond joint of FIG. 1b between the SiC CFCC materials shown per an embodiment of the invention is characterized by a composite microstructure having relatively soft, compliant aluminum bearing particle phase regions, such as Al—Si alloy particles (dark gray regions in the joint) when Al—Si alloy powder is used as a component of the bonding agent, in a SiC ceramic matrix. Such a fully fired bond joint exhibits substantially improved joint strength and toughness as a result of the composite joint microstructure having relatively soft, compliant aluminum bearing particle phase regions dispersed in a SiC ceramic matrix, such as the crystalline and amorphous SiC matrix observed by microstructural analysis. For example, bond joint strengths produced between SiC CFCC materials using the particularly preferred bonding agent described hereabove can be at least a 50% higher in strength in bend tests to be described herebelow than any other technique such as described by B. H. Rabin and C. Henager at the Proceedings of the 20th Annual Conference of Composites, Materials and Structures (U.S. Only/ITAR Restricted Sessions) held on Jan. 23–25, 1996, in Cocoa Beach, Fla. (in press), that require significantly higher firing temperatures.

The residual Al bearing (e.g. Al—Si alloy) particles dispersed in the ceramic (e.g. SiC) bond matrix after firing appear to contribute to joint toughness, although the inventors do not wish or intend to be bound by this explanation. At service temperatures below their melting point (about 577 degrees C. for the Al—Si eutectic particles), the particles would be soft solid particles enclosed in a shell of alumina formed by oxidation of the Al alloy component. At service temperatures above their melting point, the particles would be a liquid phase contained and enclosed in the shell of alumina. In both cases, the dispersed aluminum bearing particles would appear to provide a soft phase compliance to the overall high joint strength of the surrounding ceramic (e.g. SiC) matrix.

As mentioned hereabove, a joining method embodiment of the invention advantageously can be practiced in ambient air atmosphere using an open flame of a propane or other torch to heat the materials to the bonding temperature. This facilitates fabrication of structures on-site under a wide variety of field assembly conditions.

Another method embodiment of the present invention involves using the bonding agent as a filler material to repair a crack, hole or other depression in a ceramic or ceramic composite member. This method embodiment involves filling a pinhole, crack or other depression in the ceramic or CFCC material with the aforementioned bonding agent and heating the bonding agent in a manner described hereabove to a temperature not exceeding about 1200 degrees C. to form a strong and tough repair filler bond with the ceramic or CFCC material. Such a repair method of the invention can be used to repair pinholes or cracks in SiC tubes that have experienced extended service in a petroleum refinery environment, for example.

The following examples are offered for purposes of further illustrating the invention without in any way limiting it to the specific details of the examples. Examples 1 and 2 herebelow described preparation of MPSA polymers by different synthesis procedures (g=gram). Example 3 describes preparation of a bonding agent (glue paste) of an embodiment of the invention using MPSA polymer and the other two bonding agent components described.

Examples 4 and 9–24 use the bonding agent (glue or paste) described in Example 3 to effect bonding of the SiC CFCC specimen bars.

Examples 5, 6, 7, and 8 describe preparation of other preceramic polymers and their use in preparing bonding agents of other embodiments of the invention and use to effect bonding of the SiC CFCC specimen bars.

In Examples 4–17 set forth herebelow, the tests were conducted primarily using Sylramic S-200 material from Dow Corning Corporation, a SiC CFCC composite which contained 0/90-oriented woven cloths comprising Nicalon SiC fibers. The SiC matrix was formed by a preceramic polymer impregnation and pyrolysis by Dow Corning Corporation, and the resulting material had about 5% porosity. The SiC fibers comprised about 50 volume % of the CFCC material.

In Examples 18–24 set forth herebelow, the tests were conducted primarily using DuPont SiC CFCC composites which contained 0/90-oriented woven cloths comprising Nicalon SiC fibers. The SiC matrix was formed by a chemical vapor infiltration (CVI) method by DuPont Lanxide Inc., and the resulting material had about 10% porosity. The SiC fibers comprised about 40 volume % of the CFCC material.

Mechanical property evaluations were conducted by flexure methods. Prior to preparing joints, the SiC/SiC, composites, where f designates fibers, were machined using a diamond cutting wheel and a mineral oil/water cutting fluid into bars (2.6 mm by 4.1 mm by 18.9 mm for Examples 4–17 and 3.2 mm by 4 mm by 15 mm for Examples 18–23) bars typically. Since composites were machined using cutting fluid and held with bee's wax during cutting, it was observed that the specimens had a considerable amount of residue due to the porous nature of the CFCC material. Thus, to prevent secondary chemical reactions during the firing cycle and to avoid possible erroneous results, it was necessary to clean all specimen bars thoroughly prior to making joints. This cleaning was accomplished through either an 800 degrees C. bakeout in air (Examples 4–17) or a 10 minute ultrasonic cleaning in acetone and subsequent baking on a 250 degree C. hot plate for 10 minutes (Examples 18–24).

For making butt (end-to-end) joined specimens, the bonding agent was applied evenly on the axial end of each specimen bar by a spatula. The axial ends of two bars then were brought together carefully by hand in axial end-to-end alignment. For Examples 18–24, a metal vise also was used to apply uniform pressure across the joint so as to obtain a reproducible joint thickness (e.g. joint thickness of 125 microns). After about 1 minute in the metal vise, the test specimen was removed from the vise and placed on its side on a slotted alumina plate. This procedure was repeated for each test specimen. For Examples, 18–24, the firing furnace temperature was increased/decreased by the rate of 10 degrees C./minute up to/down from the terminal firing temperature of 1200 degrees C. which was held for 5 hours. For Examples 4–17, samples were heated at 10 degrees C./minute, held for 2 hours at 1200 degrees C., and cooled at 5 degrees/minute. After cooling to room temperature, all specimens were tested without any further treatment. An air firing furnace atmosphere was used.

The strength of the fired joints was measured by a four-point bend test, FIG. 2, where the test fixture had upper and lower span distances of 10 and 20 mm, respectively. Tests were conducted in displacment control with the crosshead speed of 2 microns/second (0.12 mm/minute). All tests were conducted at room temperature and at least five specimens were tested at each data point during the strength tests.

EXAMPLE 1

Preparation of methylphenylsilylene-acetylene (MPSA) polymers

To a dry, 500 ml, 2-necked, round-bottomed flask (equipped with a water condenser, a magnetic stirrer and a graduated addition funnel and flushed with dry argon) was added 100 ml of freshly distilled tetrahydrofuran (THF, from Aldrich Chemical Co.). After cooling the solution to −78° C., 0.5 moles of n-butyllithium (200 ml of 2.5 mol/L of n-BuLi in hexanes from Aldrich Chemical Co.) was added. Then 0.167 moles of trichloroethylene (15 ml of 99.5% trichloroethylene from Aldrich Chemical Co.) in 50 ml of THF was added dropwise over 20 minutes to the stirred solution. After completion of addition, the −78° C. bath was removed and the mixture was allowed to warm to room temperature. After 2 hours of stirring at room temperature, the mixture was recooled to −78° C. and 0.167 moles of methylphenyldichlorosilane (27 ml, from Huls America Inc.) was added dropwise over 10 minutes, after which the resulting mixture was stirred at room temperature for 5 hours, then refluxed for 2 hours. The mixture was cooled to room temperature and was washed with aqueous HCl. Concentration of the organic phase under vacuum gave 23.5 g (98% yield) of a viscous oil.

A sample of the above polymer(oligomer) under argon was heated to 1200° C. at 10° C./min. and held at 1200° C. for 2 hours before cooling to room temperature. The sample had a mass retention of 80% and contained 40% SiC.

EXAMPLE 2

Preparation of MPSA using sodium carbide: 50 ml round-bottomed flask was flushed with dry argon and charged with 1.05 g of sodium carbide(NaC≡CNa) and 5 ml dry pyridine. The mixture cooled with ice bath and 2.85 g of methylphenyldichlorosilane was added dropwise over 10 minutes. The mixture was stirred at room temperature for 5 hours before adding 5 ml THF and quenching with 50 ml aqueous methanol. After filtration, washing with water and drying in vacuum 0.43 g (yield 57%)of MPSA was produced.

EXAMPLE 3

Preparation of the glue paste with methylphenylsilylene-acetylene(MPSA) polymer: 10 g of example 1 methylphenylsilylene-acetylene(MPSA) polymer was blended with 15 g of spherical gas atomized powder(less than 44 μm particle size) of Al—Si(12.2% atomic % of Si) alloy and 1.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing.

EXAMPLE 4

This Example demonstrates a technique for joining bars of SiC CFCC to themselves. Weaved sheets of SiC CFCC were diamond cut to dimension of 2.6 mm×4.1 mm×18.9 mm. 10 bars were butt joined using Example 3 paste for flexure test. Example 3 glue was applied onto the surfaces of the SiC CFCC bars to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 50 MPa.

EXAMPLE 5

Preparation of the glue with polycarbosilane: 10 g of polycarbosilane polymer (manufactured in Japan by Nippon Carbon Company, Ltd. and is distributed in the United States by Dow Corning Corporation) was dissolved in 100 ml of toluene and blended with 15 g of spherical gas atomized powder (less than 44 μm particle size) of Al—Si(12.2% atomic % of Si) alloy and 1.5 g of amorphous submicron boron powder (from Aldrich Chemical Co.). The mixture was gradually concentrated while stirring to produce a homogeneous tacky glue like paste. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1 200° C. The flexural strength of the joints were measured with a 4 point bending test at room temperature. The average flexure strength for these samples were 30 MPa.

EXAMPLE 6

Preparation of the glue with poly m-phenyl ether: 10 g of poly m-phenyl ether was blended with 15 g of spherical gas atomized powder(less than 44 μm particle size) of Al—Si (12.2% atomic % of Si) alloy and 1.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 20 MPa.

EXAMPLE 7

Preparation of the glue with random copolymer of methylphenylsilylene acetylene and tetramethyldisilylene acetylene: To a dry, 500 ml, 2-necked, round-bottomed flask (equipped with a water condenser, a magnetic stirrer and a graduated addition funnel and flushed with dry argon) was added 100 ml of freshly distilled tetrahydrofuran (THF, from Aldrich Chemical Co.). After cooling the solution to −78° C., 0.5 moles of n-butyllithium (200 ml of 2.5 mol/L of n-BuLi in hexanes from Aldrich Chemical Co.) was added. Then 0.167 moles of trichloroethylene (15 ml of 99.5% trichloroethylene from Aldrich Chemical Co.) in 50 ml of THF was added dropwise over 20 minutes to the stirred solution. After completion of addition, the −78° C. bath was removed and the mixture was allowed to warm to room temperature. After 2 hours of stirring at room temperature, the mixture was recooled to −78° C. and a mixture of 0.056 moles (9 ml)of methylphenyldichlorosilane and 0.112 moles (19 ml) of 1,2-dichlorotetramethyldisilane (Huls America Inc.) was added dropwise over 10 minutes, after which the resulting mixture was stirred at room temperature for 5 hours, then refluxed for 2 hours. The mixture was cooled to room temperature and was washed with aqueous HCl. Concentration of the organic phase under vacuum gave 22 g (93% yield) of a glassy gum product.

A sample of the above copolymer under argon was heated to 1200° C. at 10° C./min. and held at 1200° C. for 2 hours before cooling to room temperature. The sample had a mass retention of 60% and contained 50% SiC.

1 g of above random copolymer was blended with 1.5 g of spherical gas atomized powder(less than 44 μm particle size) of Al—Si(12.2% atomic % of Si) alloy and 0.15 g of amorphous submicron boron powder (from Aldrich Chemical Co.). The mixture was blended at room temperature to produce a homogeneous tacky glue like paste. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 50 MPa.

EXAMPLE 8

Preparation of the glue with alternating copolymer of methylphenylsilylene acetylene and dimethylsilylene vinylene polymers: Chloroplatanic acid (3 mg) was added to a dry, argon flushed, 5 ml, two-necked, round-bottomed flask(equipped with a magnetic stirrer and a condenser). The flask was then capped with a rubber septum, and 1 ml dry THF was added via a cannula. All manipulations were carried out under an argon atmosphere. The monomer 3-phenyl-3,6,6,6-trimethyl3,6-disila-hexa-1,4-diyne (1 g)

was added to this mixture in a dropwise fashion with stirring. An exothermic reaction started. After the reaction subsided, the mixture was heated to reflux(approximately 80°–90° C.) for 30 minutes. The condenser was then removed, and the solvent was removed via distillation. A viscous product was resulted. 1 g of this copolymer was blended with 1.5 g of spherical gas atomized powder(less than 44 $\mu$m particle size) of Al—Si(12.2% atomic % of Si) alloy and 0.15 g of amorphous submicron boron powder (from Aldrich Chemical Co.). The mixture was blended at room temperature to produce a homogeneous tacky glue like paste. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 50 MPa.

EXAMPLE 9

5 g of example 1 methylphenylsilylene-acetylene(MPSA) polymer was blended with 10 g of spherical gas atomized powder(less than 44 $\mu$m particle size) of Al—Si(12.2% atomic % of Si) alloy. The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 9 MPa.

EXAMPLE 10

10 g of example 1 methylphenylsilylene-acetylene (MPSA) polymer was blended with 10 of spherical gas atomized powder(less than 44 $\mu$m particle size) of elemental Al. This mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 4 MPa.

EXAMPLE 11

9 g of example 1 methylphenylsilylene-acetylene(MPSA) polymer was blended with 9 g of spherical gas atomized powder(less than 44 $\mu$m particle size) of Al and 1.3 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 10 MPa.

EXAMPLE 12

10 g of example 1 methylphenylsilylene-acetylene (MPSA) polymer was blended with 10 g of spherical gas atomized powder(less than 44 $\mu$m particle size) of Al and 5 g of elemental Si (mechanically ground from Dow Corning Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 2 MPa.

EXAMPLE 13

8 g of example 1 methylphenylsilylene-acetylene(MPSA) polymer was blended with 8 g of spherical gas atomized powder(less than 44 $\mu$m particle size) of Al metal and 1.6 g of powder Si metal(mechanically ground from Dow Corning Co.) and 0.8 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 4 MPa.

EXAMPLE 14

10 g of example 1 methylphenylsilylene-acetylene (MPSA) polymer was blended with 15 g of spherical gas atomized powder(less than 44 $\mu$m particle size) of Al—Si (12.2% atomic % of Si) alloy and 5 g of powder Si metal(mechanically ground from Dow Corning Co.). The mixture was blended for 2 hours at room temperature tb produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 5 MPa.

EXAMPLE 15

Example 1 methylphenylsilylene-acetylene(MPSA) polymer was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 5 MPa.

EXAMPLE 16

10 g of example 1 methylphenylsilylene-acetylene (MPSA) polymer was blended with 10 g of spherical gas atomized powder(less than 44 μm particle size) of Al—Si (12.2% atomic % of Si) alloy and 10 g of powder Si metal(mechanically ground from Dow Corning Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars (2.6 mm×4.1 mm×18.9 mm) to be joined together and were spread evenly with a small laboratory spatula. These bars were then butt joined by pushing the bars together with hand pressure and were fired to 1200° C. at the rate of 10 ° C./min. and holding for 2 hours at 1200° C. The flexural strength of the joints were measured with a 4 point bending test at room temperature. The average flexure strength for these samples were 5 MPa.

EXAMPLE 17

10 g of example 1 methylphenylsilylene-acetylene (MPSA) polymer was blended with 8 g of spherical gas atomized powder(less than 44 μm particle size) of Al—Si (12.2% atomic % of Si) alloy and 8 g of powder Si metal (mechanically ground from Dow Corning Co.) and 1.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC (2.6 mm×4.1 mm×18.9 mm)bars to be joined together and were spread evenly with a small laboratory spatula. These bars were then butt joined by pushing the bars together with hand pressure and were fired to 1200° C. at the rate of 10° C./min. and holding for 2 hours at 1200° C. The flexural strength of the joints were measured with a 4 point bending test at room temperature. The average flexure strength for these samples were 5 MPa.

EXAMPLE 18

8.5 g of example 1 methylphenylsilylene-acetylene (MPSA) polymer was blended with 1 g of spherical gas atomized powder(less than 44 μm particle size) of Al—Si (12.2% atomic % of Si) alloy and 0.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 19

7.5 g of example 1 methylphenylsilylene-acetylene (MPSA) polymer was blended with 2 g of spherical gas atomized powder(less than 44 μm particle size) of Al—Si (12.2% atomic % of Si) alloy and 0.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 20

5.5 g of example 1 methylphenylsilylene-acetylene (MPSA) polymer was blended with 4 g of spherical gas atomized powder(less than 44 μm particle size) of Al—Si (12.2% atomic % of Si) alloy and 0.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 21

3.5 g of example 1 methylphenylsilylene-acetylene (MPSA) polymer was blended with 6 g of spherical gas atomized powder(less than 44 μm particle size) of Al—Si (12.2% atomic % of Si) alloy and 0.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 22

2.5 g of example 1 methylphenylsilylene-acetylene (MPSA) polymer was blended with 7 g of spherical gas atomized powder(less than 44 μm particle size) of Al—Si (12.2% atomic % of Si) alloy and 0.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 23

3.75 g of example 1 methylphenylsilylene-acetylene (MPSA) polymer was blended with 6 g of spherical gas atomized powder(less than 44 μm particle size) of Al—Si (12.2% atomic % of Si) alloy and 0.25 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC bars(3.2 mm×4 mm×15 mm) to be joined together and were spread evenly with a small laboratory spatula. These bars were then butt joined by pushing the bars together with hand pressure and were fired to 1200° C. at the rate of 10° C./min. and holding for 2 hours at 1200° C.

Example 24

The starting CFCC materials were 3.2 mm thick panels of commercial SiC/SiC composites (Du Pont Lanxide Inc.) which had Nicalon SiC-fibers in 0/90 degree orientations and contained 10% porosity. Prior to preparing joints the SiC/SiC composites were first machined into 3.2 mm×4 mm×15 mm bars. To remove the residual chemical substances due to the cutting fluid the bars were first cleaned for 10 minutes in acetone and then baked on a 250 degrees C. hot-plate for 10 minutes.

The joining compound was composed of 10 g of MPSA polymer (from Example 1.) blended with 15 g of spherical gas atomized powder (less than 44 μm particle size) of Al-12.2 at. % Si alloy and 1.5 g of amorphous submicron boron powder (from Aldrich Chemical Co.). The mixture was blended for 2 hours at room temperature to produce a homogeneous tacky glue-like paste. The bonding agent was applied on each specimen ends by a spatula. The joints were first assembled carefully by the hand pressure from the ends (butt-joint). A vise then was utilized to apply uniform pressure to obtain reproducible joint thickness. After about 1 minute the joined specimen was removed from the vise and placed on its side on a slotted alumina plate. This procedure was repeated for each test specimen. Curing was conducted in air at 1200 C. The heating/cooling rate was 10 C./min and the curing time was 5 hrs.

The strength of the joints was measured by the four-point bend test method where the test fixture, shown schematically in FIG. 2, had the upper and lower span distances of 10 and 20 mm, respectively. All tests were conducted in displacement control at room temperature with the cross-head speed of 2 mm/s (0.1 2 mm/min). At each data point five specimens were tested. The average flexure or bend strength for these samples was 97 MPa.

TABLE I

The Table I below sets forth for Examples 4–23 the bonding agent composition used, and bend strength (BS) determined as described hereabove.

| Example | Polymer (g) | Alloy Si-Al (g) | Boron (g) | Silicon (g) | Aluminum (g) | BS (MPa) |
|---|---|---|---|---|---|---|
| 4 | (MPSA) 10 | 15 | 1.5 | — | — | 50 |
| 5 | (Polycar.) 10 | 15 | 1.5 | — | — | 30 |
| 6 | (Poly n-p) 10 | 15 | 1.5 | — | — | 20 |
| 7 | (R. copol) 1 | 1.5 | 0.15 | — | — | 50 |
| 8 | (Alt) 1 | 1.5 | 0.15 | — | — | 50 |
| 9 | (MPSA) 5 | 10 | — | — | — | 9 |
| 10 | (MPSA) 10 | — | — | — | 10 | 4 |
| 11 | (MPAS) 9 | — | 1.3 | — | 9 | 10 |
| 12 | (MPSA) 10 | — | — | 5 | 10 | 2 |
| 13 | (MPSA) 8 | — | 0.8 | 1.6 | 8 | 4 |
| 14 | (MPSA) 10 | 15 | — | 5 | — | 5 |
| 15 | (MPSA) ONLY | — | — | — | — | 5 |
| 16 | (MPSA) 10 | 10 | — | 10 | — | 5 |
| 17 | (MPSA) 10 | 8 | 1.5 | 8 | — | 45 |
| 18 | (MPSA) 8.5 | 1 | 0.5 | — | — | |
| 19 | (MPSA) 7.5 | 2 | 0.5 | — | — | |
| 20 | (MPSA) 5.5 | 4 | 0.5 | — | — | |
| 21 | (MPSA) 3.5 | 6 | 0.5 | — | — | |
| 22 | (MPSA) 2.5 | 7 | 0.5 | — | — | |
| 23 | (MPSA) 3.75 | 6 | 0.25 | — | — | |
| 24 | (MPSA) 10 | 15 | 1.5 | — | — | 97 |

The bend strength for Example 24 is about twice as high as the bend strength that results from any other known method for joining SiC CFCC materials. Example 24 was repeated using another sample and a lower firing temperature of 1000 degrees and yielded a bend strength of 95 MPa. Bend strength results were not available for Examples 18–23. In general, all of the bend strength values that exceed 45 MPa are promising; i.e., Examples 4, 7, 8, 17 and 24. All of these results at least match the previous best results that have been reported for SiC CFCC joining by B. H. Rabin and C. Henager in the aforementioned Proceedings of the 20th Annual Conference of Composites. It should be noted that the butt joint sample that was tested has a very small total surface area and is quite susceptible to sample preparation variations, chiefly material and porosity inhomogeneity. Therefore, some of the samples that have average strength values less than 45 MPa but considerable scatter in the measurements may also be promising. The much higher strength level of Example 24 compared to Example 4 is attributed to greater care in initial joint cleaning, to improved sample alignment and even joint pressure during joint formation, and to enhanced stability of the grooved sample holder during sample firing. Because the improvements in sample preparation used for Example 24 were also used for Examples 18–23, a greater reliability for these results may be assigned, as compared to Examples 5–17.

Additional Examples 25 and 26 are set forth below for further illustration.

EXAMPLE 25

10 g of polydimethylsiloxanes (silicone oil) was blended with 15 g of spherical gas atomized powder(less than 44 μm particle size) of Al—Si(12.2% atomic % of Si) alloy and 1.5 g of amorphous submicron boron powder (from Aldrich Chemical Co.). The mixture was blended for 2 hours at room temperature to produce a homogeneous tacky glue like paste. This material was then loaded into a polyethylene syringe for convenient dispensing. The glue was applied onto the surfaces of the SiC CFCC (2.6 mm×4.1 mm×38 mm)bars to be joined together and were spread evenly with a small laboratory spatula. These bars were then butt joined by pushing the bars together with hand pressure and were fired to 1200° C. at the rate of 10° C./min. and holding for 2 hours at 1200° C.

EXAMPLE 26

10 g of methylsesquisiloxane polymer (SR350 from GE Silicones) was dissolved in 5 ml of toluene and blended with 15 g of spherical gas atomized powder(less than 44 μm particle size) of Al—Si(12.2% atomic % of Si) alloy and 1.5 g of amorphous submicron boron powder (from Aldrich Chemical Co.). The mixture was gradually concentrated while stirring to produce a homogeneous tacky glue like paste. This material was then loaded into a polyethylene syringe for convenient dispensing. The glue was applied onto the surfaces of the SiC CFCC (2.6 mm×4.1 mm×38 mm) bars to be joined together and were spread evenly with a small laboratory spatula These bars were then butt joined by pushing the bars together with hand pressure and were fired to 1200° C. at the rate of 10° C./min. and holding for 2 hours at 1200° C.

The invention is not limited to the embodiments set forth above, and the invention is set forth in the following claims.

We claim:

1. A method of joining ceramic or ceramic composite materials, comprising disposing a bonding agent at an interface between said materials wherein the bonding agent comprises a preceramic polymer, aluminum bearing particulates, and boron particulates in proportions effective to form upon heating a joint comprising metallic phase regions comprising aluminum disposed in a ceramic joint material and heating the interface to a temperature not exceeding about 1200 degrees C. to form said joint between the materials.

2. The method of claim 1 wherein the interface is heated in an air atmosphere.

3. The method of claim 2 wherein the interface is heated by an open flame of a torch in the ambient air atmosphere.

4. The method of claim 1 wherein the interface is heated in an inert atmosphere.

5. The method of claim 1 wherein the aluminum bearing particulates are selected from elemental aluminum powder, aluminum alloy powder, and mixtures of elemental aluminum powder with a second powder.

6. The method of claim 1 wherein the boron particulates comprise boron powder having a powder particle size below 1 micron.

7. The method of claim 1 wherein the bonding agent comprises, in weight %, about 25% to 85% preceramic polymer, about 10% to 70% aluminum bearing powder, and about 2% to 6% boron powder.

8. The method of claim 1 including forming second ceramic phase regions in a ceramic matrix of the ceramic joint material.

9. The method of claim 1 wherein the ceramic composite material comprises SiC fibers disposed in a SiC matrix.

10. A method of repairing ceramic or ceramic composite material, comprising filling a crack, hole or depression in the material with a bonding agent comprising a preceramic polymer, aluminum bearing particulates, and boron particulates in proportions effective to form upon heating a filler comprising metallic phase regions comprising aluminum disposed in a ceramic filler material and heating the bonding agent to a temperature not exceeding about 1200 degrees C. to form said filler in said crack, hole or depression.

11. The method of claim 10 wherein the ceramic material comprises monolithic SiC.

12. The method of claim 10 wherein the ceramic composite material comprises SiC fibers disposed in a SiC matrix.

13. The method of claim 10 wherein the bonding agent comprises, in weight %, about 25% to 85% preceramic polymer, about 10% to 70% aluminum bearing powder, and about 2% to 6% boron powder.

14. The method of claim 10 wherein the bonding agent is heated in an air atmosphere.

15. A method of joining ceramic or ceramic composite materials, comprising disposing a bonding agent at an interface between said materials wherein the bonding agent comprises a preceramic polymer, aluminum bearing particulates, and boron particulates in proportions effective to form upon heating a joint comprising metallic phase regions comprising aluminum disposed in a ceramic joint material and heating the interface in an oxygen bearing atmosphere to a temperature not exceeding about 1200 degrees C. to form said joint between the materials.

16. A method of repairing ceramic or ceramic composite material, comprising filling a crack, hole or depression in the material with a bonding agent comprising a preceramic polymer, aluminum bearing particulates, and boron particulates in proportions effective to form upon heating a filler comprising metallic phase regions comprising aluminum disposed in a ceramic filler material and heating the bonding agent in an oxygen bearing atmosphere to a temperature not exceeding about 1200 degrees C. to form said filler in the crack, hole or depression.

* * * * *